United States Patent

[11] 3,609,167

| [72] | Inventor | Charles L. Zirkle<br>Berwyn, Pa. |
|---|---|---|
| [21] | Appl. No. | 184,513 |
| [22] | Filed | Apr. 2, 1962 |
| [45] | Patented | Sept. 28, 1971 |
| [73] | Assignee | Smith Kline & French Laboratories<br>Philadelphia, Pa. |

[54] IBENZO [b,e] THIEPINES
3 Claims, No Drawings

[52] U.S. Cl............................................................ 260/327 B,
260/239 A, 260/239 B, 260/240 F, 260/243 B,
260/247.1, 260/247.7 C, 260/268 PC, 260/293.4
D, 260/294.7 C, 260/326.5 SA, 260/326.84,
260/333, 260/473 G, 260/476 R, 260/516,
260/520, 260/999

[51] Int. Cl........................................................... C07d 67/00
[50] Field of Search............................................. 260/327,
333, 516, 328

[56] References Cited
UNITED STATES PATENTS

| 2,676,971 | 4/1954 | Cusic et al. ............... | 260/328 |
|---|---|---|---|
| 3,047,580 | 7/1962 | Sprague...................... | 260/268 |
| 3,113,137 | 12/1963 | Schaeren et al. ........... | 260/327 |
| 3,116,291 | 12/1963 | Petersen et al. ............ | 260/240 |

FOREIGN PATENTS

| 607,503 | 2/1962 | Belgium ...................... | 260/327 |
|---|---|---|---|

OTHER REFERENCES

Stach et al. Angew, Chem. Internat. Ed., Vol. 1 (1-27-62), pages 50– 1.

*Primary Examiner*—James A. Patten
*Attorneys*—William H. Edgerton, Richard D. Foggio and Joan S. Keps

ABSTRACT: Disclosed are dibenzo [b,e]-oxepin and dibenzo [b,e]thiepin-11-one useful as intermediates for the preparation of corresponding 11-aminoalkylated derivatives which have pharmaceutical activity.

DIBENZO[b,e] THIEPINES

This invention relates to novel dibenzo[b,e]-oxepin- and dibenzo[b,e]thiepin-11-ones. These novel compounds are useful as intermediates for the preparation of corresponding 11-aminoalkylated derivatives which are useful as tranquilizers, antidepressants, antiemetics, antihistamines, potentiators and generally effect the central nervous system. The preparation of these 11-aminoalkylated derivatives from the novel compounds of this invention is described more fully hereinbelow.

The novel dibenzo[b,e]oxepin- and dibenzo[b,e]-thiepin-11-ones of this invention are represented by the following general structural formula:

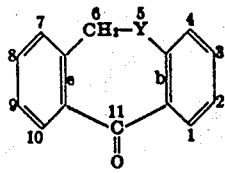

FORMULA I when Y represents oxygen or sulfur.

In the structure of Formula I, the benzenoid rings may be substituted with a halogen such as chlorine or bromine, alkyl, alkoxy, alkylthio or trifluoromethyl group and when Y is sulfur, said sulfur atom may be oxidized to the sulfoxide or sulfone.

The dibenzo[b,e]oxepin-11-ones are prepared as shown by the following illustrative synthetic scheme:

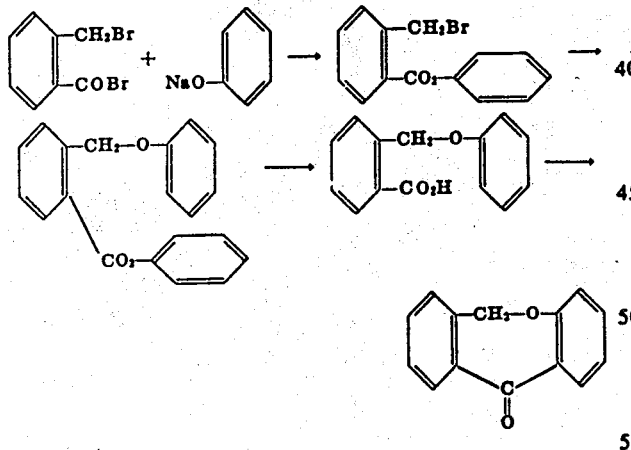

Thus, α-bromo-o-toluoyl bromide [J. Chem. Soc. 12, 2207 (1922)] is reacted with phenol using the Schotten-Baumann technique to give the phenyl ester. The ester is converted to the either by refluxing with phenol, in a solvent such as acetone, in the presence of an alkali metal carbonate, such as potassium carbonate, and copper-bronze catalyst. Hydrolysis with an alkali metal hydroxide, such as sodium hydroxide, in for example aqueous ethanol gives the 2-carboxybenzyl phenyl ether [U.S. Pat. No. 2,862,956; Examples 1 and 6] which is then cyclodehydrated with an acidic reagent such as a mineral acid, for example polyphosphoric acid, sulfuric acid or hydrofluoric acid, or a polyphosphoric acid ester such as that prepared from phosphorus pentoxide in ethanol, to give the dibenzo[b,e]oxepin-11-one.

The dibenzo[b,e]thiepin-11-ones are prepared as shown by the following illustrative synthetic scheme:

Thus, 2-carboxybenzyl bromide [C.A. 47:3255a] is reacted with thiophenol, in a solvent such as acetone and in the presence of an alkali metal carbonate, such as potassium carbonate, to give 2-carboxybenzyl phenyl sulfide [U.S. Pat. No. 2,862,956; Example 3]. Cyclodehydration of this sulfide with an acidic reagent such as a mineral acid, for example polyphosphoric acid or the like at from 90° to 120° C yields the dibenzo[b,e]thiepin-11-one.

Both the 2-carboxybenzyl phenyl ether and sulfide as shown above in the synthetic schemes are particularly useful as intermediates for the preparation of dibenzo[b,e]-oxepin- and thiepin-11-ones since the isomeric 2-carboxyphenyl benzyl ether and sulfide gave little or no cyclized product.

11-Aminoalkylated dibenzo[b,e]oxepins and dibenzo[b,e]thiepins useful as tranquilizers, antidepressants, antiemetics, antihistamines, potentiators and central nervous system effectors are readily prepared from the derivatives of Formula I and are represented by the following general structural formulas:

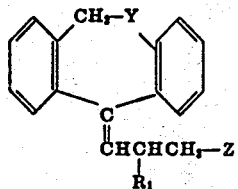

FORMULA II

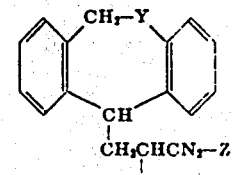

FORMULA III where Y is oxygen or sulfur; $R_1$ is hydrogen or methyl; and Z is amino, monoloweralkylamino, diloweralkylamino (the alkyl moieties having from one to six carbon atoms) or a monocyclic heterocyclic amino moiety containing from four to 12 carbon atoms, and containing a maximum of two hetero ring members selected from the group of oxygen, nitrogen and sulfur, such as pyrrolidino, morpholino, thiamorpholino, piperidino or N'-substituted-N-piperazino, for example N'-methyl, hydroxyethyl, acetoxyethyl or hydroxyethoxyethyl-N-piperazino. Also, the benzenoid rings may be substituted with a halogen such as chlorine or bromine, alkyl, alkoxy, alkylthio or trifluoromethyl group and when Y is sulfur, said sulfur atom may be oxidized to the sulfoxide or sulfone. The term aminoalkyl is used generically herein to include all amino, monoloweralkylamino, diloweralkylamino and heterocyclic aminoalkyl moieties as set forth in Formulas II and III, unless otherwise specified.

Thus, the dibenzo[b,e]oxepin- and dibenzo[b,e]-thiepin-11-ones of Formula I are reacted with a diloweralkylaminoalkyl or heterocyclic aminoalkyl magnesium halide in an inert organic solvent such as ether, dioxane or preferably tetrahydrofuran. The reaction is carried out at a temperature of from about 30° C. to 100° C. for a period of from about 30 minutes to 4 hours. Removal of the solvent and treatment of the residue with water or ammonium chloride solution separates the useful intermediates, the 11-hydroxy-11-aminoalkyl-dibenzo[b,e]oxepins and -dibenzo[b,e]thiepins.

These 11-hydroxy derivatives are dehydrated by treatment with a mineral acid such as hydrochloric or sulfuric acid at about 60° C. to 100° C. for a period of about 1 to 5 hours. Removal of the excess acid gives the useful products, 11-aminoalklyidene-dibenzo[b,e]oxepins and -dibenzo[b,e]thiepins as represented by Formula II.

The piperazinyl derivatives of Formula II having a free terminal nitrogen atom are prepared by employing as described above an N-benzylpiperazinylalkyl magnesium halide to give the corresponding 11-hydroxy derivative. The benzyl protective group is removed by hydrogenolysis and then the 11-hydroxy derivative with a free terminal nitrogen atom on the piperazinyl moiety is dehydrated to the alkylidene compound. Further alkylation of the N-piperazinyl derivative thus obtained with an alkylene oxide, alkylene halohydrin or hydroxyalkoxy-loweralkyl halide yields other N'-substituted piperazinyl compounds of Formula II. Acetylation of the N'-hydroxyalkyl-N-piperazinyl compounds thus formed with for example acetyl chloride yields the corresponding N'-(ω-acetoxyalkyl)-n-piperazinyl derivatives of Formula II.

Certain of the 11-aminoalkylidene derivatives represented by Formula II above are advantageously prepared by reacting the dibenzo[b,e]oxepin- and dibenzo[b,e]thiepin-11-ones of Formula I with a methoxyalkyl magnesium halide as described above to give the intermediate 11-methoxyalkyl-11-hydroxy-dibenzo[b,e]oxepins and -dibenzo[b,e]thiepins. These useful intermediates are treated with concentrated (48 percent) hydrobromic acid to give simultaneous dehydration of the 11-hydroxy group aNd cleavage of the methyl ether linkage. The resulting 11-bromoalkylidene intermediates are treated with ammonium, a monoloweralkylamine, diloweralkylamine, pyrrolidine, piperidine or N-loweralkyl-piperazine to give the corresponding amino substituted products of Formula II.

The 11-aminoalkylidene derivatives of Formula II, in addition to having the utility described above, are useful as intermediates to prepare the 11-aminoalkyl compounds as represented by Formula III. Thus, the alkylidene compounds are reduced by hydrogenation in the presence of a hydrogenation catalyst, such as platinum oxide or palladium-on-charcoal to give the alkyl derivatives.

The alkylidene compounds of Formula II may be present as cis or trans isomers as well as mixtures of these isomers. The isomers are separated by fractional crystallization of their acid addition salts from a suitable solvent or mixture of solvents such as for example, acetone-ether or ethanol-ether. In addition, certain compounds of Formulas II and III, in which $R_1$ is methyl, may be present as optical isomers. The connotation of the general formulas presented herein to include all isomers, the separated d or l optical isomers as well as the dl mixture and the separated cis or trans isomers as well as the mixture of these isomers.

The following examples illustrate the preparation of the compounds of this invention and further provide exemplary preparations of 11-aminoalkylated derivatives thereof.

EXAMPLE 1

A mixture of 10.8 g. of 2-carboxybenzyl bromide, 5.5 g. of thiophenol, 13.8 g. of anhydrous potassium carbonate and 25 ml. of acetone is refluxed for 1½ hours. The reaction mixture is poured into 500 ml. of water and the solution acidified with concentrated hydrochloric acid. An oil which solidifies on standing is recrystallized from benzene-petroleum ether to give 2-carboxybenzyl phenyl sulfide, m.p. 106°–108° C.

A mixture of 150 ml. of 85 percent phosphoric acid and 240 g. of phosphorus pentoxide is heated to 115° C. To this mixture with vigorous stirring is added 32.5 g. of 2-carboxybenzyl phenyl sulfide. The mixture is maintained at 105°–115° C. for three-fourths of an hour and then poured into 1.5 l. of cold water. An initial oil soon solidifies and is extracted with either. The extract is washed with 10 percent sodium hydroxide solution and then water. The dried extract is decolorized and concentrated to give a solid. Recrystallization from ethanol gives dibenzo [b,e]thiepin-11-one, m.p. 83°–84° C.

EXAMPLE 2

To a solution of 16.0 g. of phenol in 80 ml. of water and 80 ml. of 20 percent sodium hydroxide solution is added 48.0 g. of α-bromo-o-toluoyl bromide at room temperature. The reaction mixture is stirred an additional 15 minutes and extracted with ether. The extract is washed with 10 percent sodium hydroxide solution and then water. The dried extract is concentrated under reduced pressure and the residue distilled to given phenyl α-bromo-o-toluate, b.p. 155°–157° C./0.1 mm., m.p. 41°–45° C.

A mixture of 19.2 g. of phenyl α-bromo-o-toluate, 6.8 g. of phenol, 9.1 g. of anyhydrous potassium carbonate, 250 ml. of acetone aNd 0.7 g. of copper-bronze is stirred and heated to reflux. The reaction mixture is refluxed for 24 hours, diluted with water, filtered and the filtrate extracted with ether. The extract is washed with 10 percent sodium hydroxide solution and then water. The died extract is concentrated to give 2-carboxybenzyl phenyl ether, phenyl ester, m.p. 81.5°–83° C.

A mixture of 11.0 g. of the above phenyl ester, 11.0 g. of sodium hydroxide, 99 g. of ethanol and 11 ml. of water is refluxed for 1½ hours. The mixture is poured into 1.0 l. of cold water and acidified with concentrated hydrochloric acid to yield a precipitate of 2-carboxybenzyl phenyl ether, m.p. 121°–124° C.

To 28.4 g. of phosphorus pentoxide is added 23.0 g. of ethanol with vigorous stirring and then 11.4 g. of 2-carboxybenzyl phenyl ether. The mixture is refluxed for about 30 minutes, poured into 500 ml. of cold water and then extracted with ether. The extract is washed with 10 percent sodium hydroxide solution and then water. The dried extract is concentrated to give dibenzo [b,e]oxepin-11-one.

EXAMPLE 3

A Grignard reagent is formed in tetrahydrofuran from 4.8 g. of 3-dimethylaminopropyl chloride and 1.0 g. of magnesium, initiating the reaction with ethyl bromide. After refluxing under nitrogen with stirring for 1 hour, a solution of 6.0 g. of dibenzo [b,e]thiepin-11-one in 50 ml. of tetrahydrofuran is added and the mixture refluxed for 2½ hours. The solvent is removed in vacuo and the residue poured into an ice-water, ammonium chloride solution to give 11-hydroxy-11-(3-dimethylaminopropyl)dibenzo[b,e]thiepin, m.p. 132.5°–133.5 ° C.

The hydroxy compound (2.1 g.) is dehydrated by heating for 3 hours with 200 ml. of concentrated hydrochloric acid on the steam bath. Removal of the acid in vacuo gives 11-(3-diemthylaminopropylidene)dibenzo[b,e]-thiepin hydrochloride, m.p. 210°–213° C.

The free base is obtained by making a solution of the hydrochloride salt basic and extracting with ether.

EXAMPLE 4

To the Grignard reagent formed from 9.6 g. of 3-dimethylaminopropyl chloride and 2.0 g. of magnesium in tetrahydrofuran is added a solution of 11.2 g. of dibenzo[b,e oxepin-11-one in 100 ml. of tetrahydrofuran and the mixture refluxed for 3 hours. The solvent is removed in vacuo and the residue poured into ice-water, ammonium chloride solution to give 11-hydroxy-11-(3-dimethylaminopropyl)dibenzo[b,e]oxepin.

The hydroxy compound (5.0 g.) is dehydrated by heating for 3 hours with 50 ml. of concentrated hydrochloric acid on the steam bath. Removal of the acid in vacuo gives 11-(3-dimethylaminopropylidene)dibenzo[b,e]-oxepin hydrochloride from which is obtained the free base.

EXAMPLE 5

Hydrogenation of 1.0 g. of each of 11-(3-dimethylaminopropylidene)dibenzo[b,e]thiepin and 11-(3-dimethylaminopropylidene)dibenzo[b,e]oxepin with palladium-on-charcoal catalyst in ethanol solution at atmospheric pressure for 3 hours gives, after filtration, concentration and recrystallization, the corresponding 11-(3-dimethylaminopropyl)dibenzo[ ]thiepin and 11-(3-dimethylaminopropyl)dibenzo[b,e]oxepin.

What is claimed is:
1. A compound of the formula:

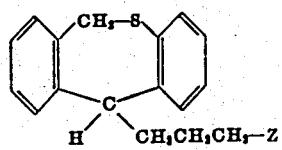

wherein Z is a member selected from the group consisting of monoloweralkylamino and diloweralkylamino.

2. 11-(3-Dimethylaminopropyl)dibenzo[ ]thiepin.
3. The compound of the formula:

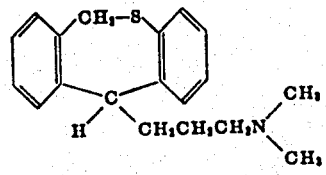

PO-1050
(5/69)

UNITED STATES PATENT OFFICE
CERTIFICATE OF CORRECTION

Patent No. 3,609,167  Dated September 28, 1971

Inventor(s) Charles L. Zirkle

It is certified that error appears in the above-identified patent and that said Letters Patent are hereby corrected as shown below:

Column 6, line 11, should read, 2. 11-(3-Dimethylaminopropyl)dibenzo[b,e]thiepin.

Column 6, lines 15-20, the structural formula should be,

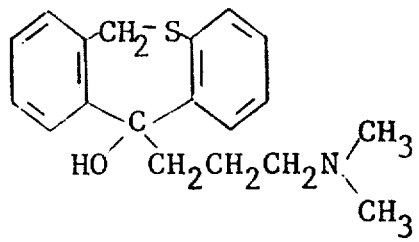

Signed and sealed this 6th day of February 1973.

(SEAL)
Attest:

EDWARD M. FLETCHER, JR.
Attesting Officer

ROBERT GOTTSCHALK
Commissioner of Patents